Jan. 2, 1934.  R. W. CLIFFORD  1,941,464
DRIVING MECHANISM
Filed Aug. 2, 1930  2 Sheets-Sheet 1

INVENTOR
Roger W. Clifford.
BY  S. C. Yeaton
ATTORNEY

Jan. 2, 1934.  R. W. CLIFFORD  1,941,464
DRIVING MECHANISM
Filed Aug. 2, 1930  2 Sheets-Sheet 2
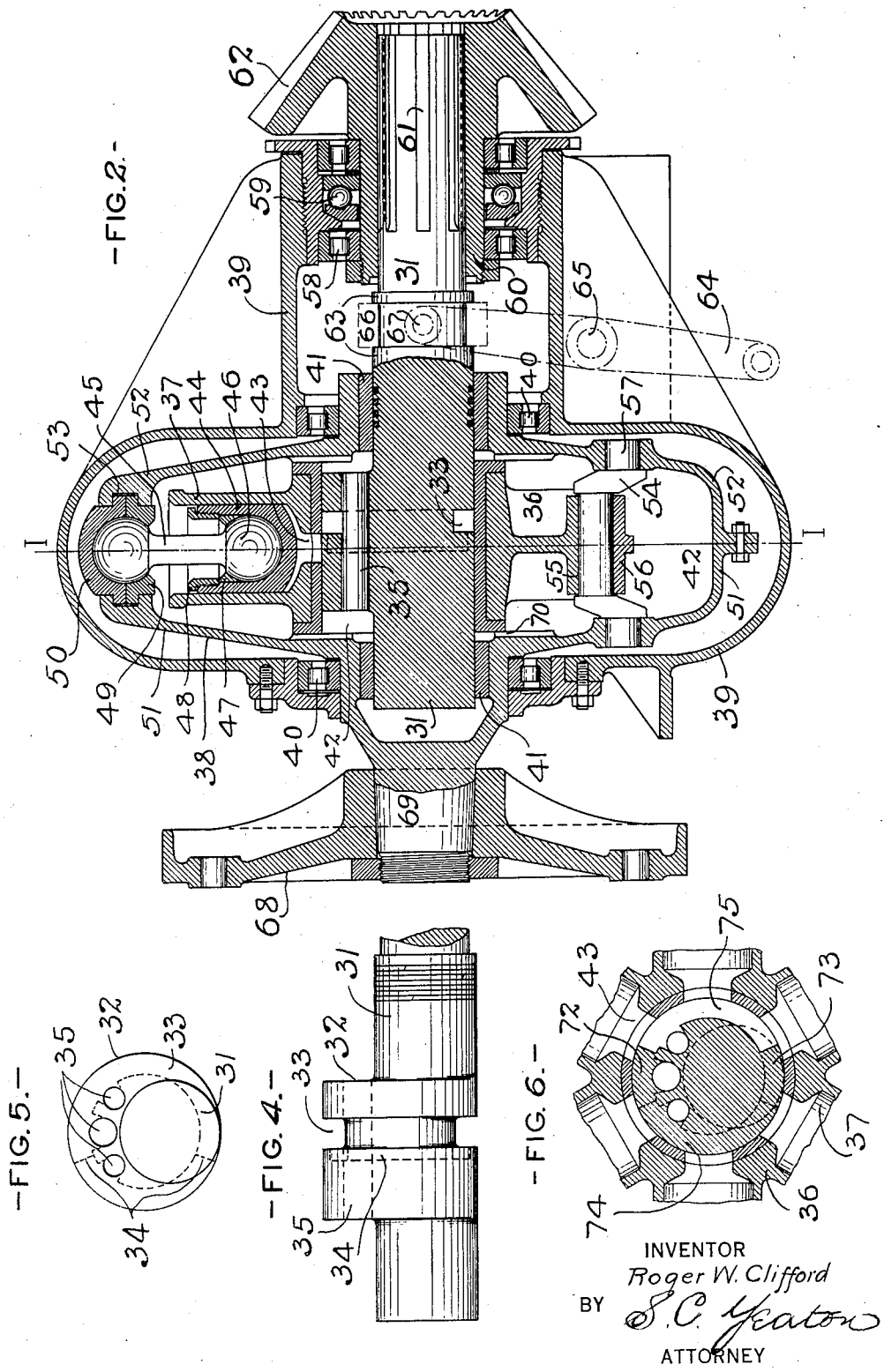
INVENTOR
Roger W. Clifford
BY S. C. Yeaton
ATTORNEY Patented Jan. 2, 1934

1,941,464

UNITED STATES PATENT OFFICE 1,941,464

DRIVING MECHANISM

Roger W. Clifford, Schenectady, N. Y.

Application August 2, 1930. Serial No. 472,629

16 Claims. (Cl. 192—60)

This invention is adapted more generally to locomotives, and more particularly to those of the geared type.

An object of this invention is to provide a friction clutch having great holding power, the friction surfaces being disposed to produce a resistance acting on a maximum leverage.

Figure 1:
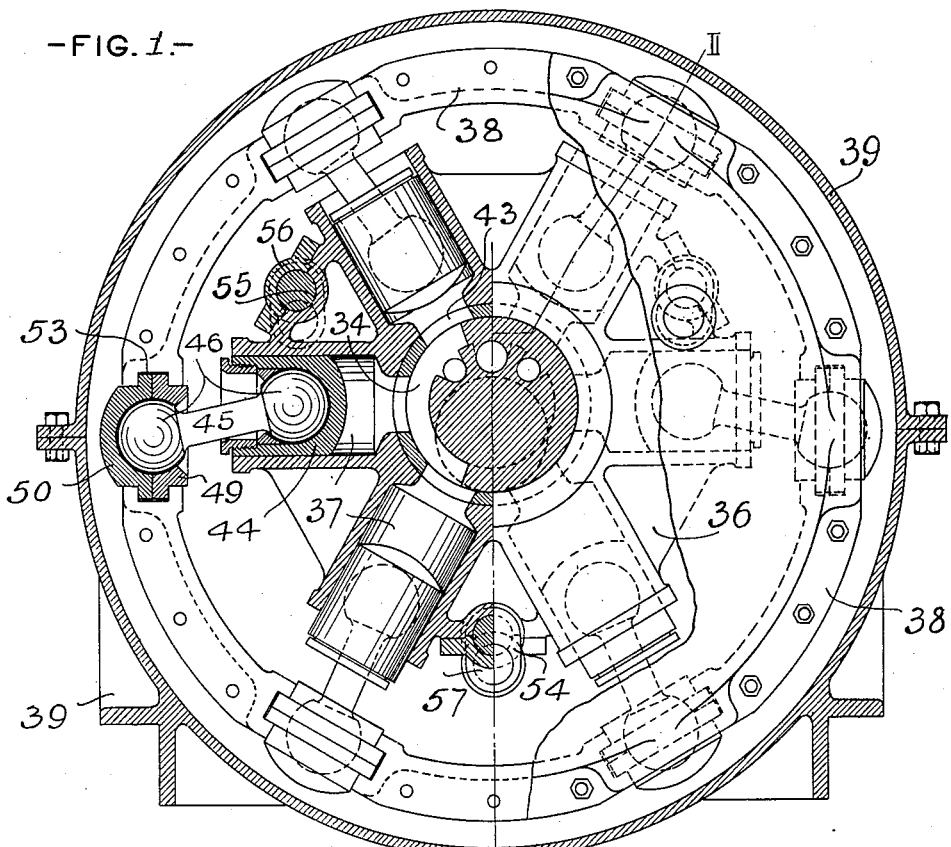
Figure 3:
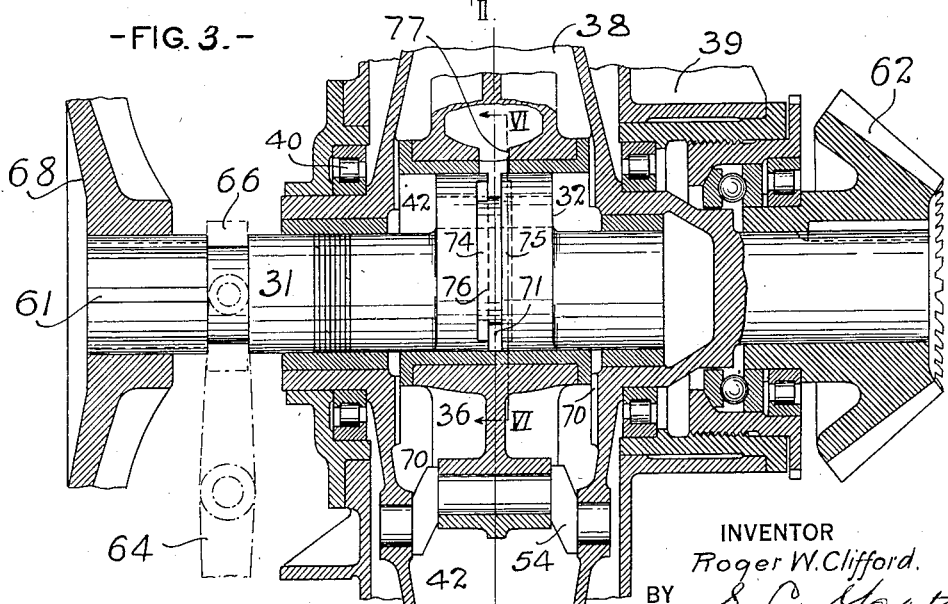

Further objects of the invention will be apparent from the following specification, and the accompanying drawings illustrating approved embodiments of the invention, in which Figure 1 is a vertical section of the clutch of the present invention, taken on the line I—I of Fig. 2; Fig. 2 is a longitudinal section taken through the line II—II of Fig. 1; Fig. 3 is a fragmental view similar to Fig. 2 showing a modification; Fig. 4 is a side elevation of the clutch crank shaft and crank pin of Fig. 2; Fig. 5 is an end view of the parts shown in Fig. 4; Fig. 6 is a partial vertical section taken on the line VI—VI of Fig. 3.

Referring more in detail to the drawings, the clutch comprises a crank shaft 31, having a crank pin 32. The crank pin is formed with a circumferential groove 33, made in two widths, the greater width 34 extending less than half the circumference of the crank pin. The ports 35 pass longitudinally through the pin communicating with groove 33. A spider 36 is freely mounted on the pin 32 so as to rotate eccentrically about the shaft, and a plurality of cylinders 37 are carried by the spider. A rotor 38 is mounted in a housing 39 on roller bearings 40, the housing being adapted to be supported on the locomotive frame or other equipment when used. The crank shaft 31 is disposed to pass centrally through the rotor and is journalled in bearings 41 of the rotor. The pin 32 is of such length and so positioned on the crank shaft 31 as to leave spaces between its ends and the opposite inner walls of the rotor to which the ports 35 are open. The crank shaft 31 and the seat of the spider 36 serve to enclose these spaces, forming chambers 42 which, through the channels 70 passing between the spider and the rotor walls, are in communication with a source of fluid in the interior of the rotor, preferably lubricating oil. The inner ends of the cylinders are provided with openings 43 adjacent the crank pin 32, and the outer ends of the cylinders are open to receive the single acting pistons 44. The pistons 44 are coupled to piston rods 45 having ball shaped ends 46. The piston rods are held in place in the pistons by the seats 47 and the retaining bushings 48. The outer ends of the piston rods are coupled to the rotor 38 by bearing blocks 49 and 50 clamped between the sections 51 and 52 of the rotor 38 in the sockets 53.

The cylinder spider 36 is also coupled to the rotor by cranks 54 secured in the bearings 55 in the spider by caps 56, and journalled in the rotor in bearings 57. The cranks 54 have the same throw as the crank pin 32 on the main shaft. A sleeve 60 is slidably secured to the crank shaft 31 by spline connections 61, and roller bearings 58 and thrust bearings 59 for said sleeve 60 are mounted in the housing 39. A bevelled gear 62 is carried by the sleeve 60 providing means for coupling the clutch with any desired mechanism which is to be operated by power transmitted through the clutch. Collars 63 are formed on the crank shaft 31 so that a suitable mechanism may be applied to move the shaft longitudinally, which mechanism includes the lever 64, fulcruming about a pin 65, fixed in the housing 39, the lever being pivotally connected at the point 67 to a ring 66 disposed between the collars 63. The rotor is adapted to be operably connected to a motor (not shown) by a suitable coupling 68 secured to the end of the shaft 69 formed on said rotor.

When the shaft 31 is at rest in a position where the ports of the crank pin are in full communication with all of the cylinders through the circumferential groove and there is consequently no restriction of the flow of oil from the cylinders during their strokes the rotor and cylinders will revolve freely about the crank pin without imparting any motion whatever to the pin and shaft. In operation of the clutch, presuming the crank shaft to be in the aforesaid position, when it is desired to drive the shaft by the motor in a counter-clockwise direction as viewed in Fig. 1, the lever 64 is thrown to the left, shifting the shaft to the right (Fig. 2) so that three of the cylinders (as shown at the right in Fig. 1) are cut off from communication with the ports of the crank pin so as to function to effect a driving of the shaft by the rotor. The cylinders which are not cut off from communication will be in communication with the oil supply and will fill with oil. The three functioning cylinders which have been cut off from communication, having been previously filled with oil, will tend to move toward their pistons and will exert a compressive force on the oil, and the cylinders will be locked to the shaft 31, providing the required drive. The continued rotation of the rotor 38 will revolve the cylinders, spider and crank shaft as a unit, and the power from the motor will be transmitted to the bevelled gear 62. If the crank shaft 31 is moved longitudinally so that groove 33 is in communication with all of the cylinders, but only by a slight amount with the three functioning cylinders, permitting the oil to be held in the said functioning cylinders except for a slight leakage, a proportionate relative rotation between the cylinders and the crank pin will result, that is to say, the crank shaft will continue to be driven by the rotor as long as high enough pressure is maintained in the said functioning cylinders to lock that is, to cooperatively engage, said functioning cylinders with the crank pin, or in other words, as long as the functioning cylinders are closed their pistons will be prevented by the oil from moving inwardly thus effecting the locking action, while by allowing an appropriate partial escape of oil therefrom, the locking action will be correspondingly relieved and a proportionate amount of relative movement between the pin and cylinders will result. It will thus be seen that the device, by suitable control of the lever 64, may be employed both as a clutch and as means to provide variable speeds of the locomotive or other driven device, although it is contemplated that any suitable change speed device may be employed in connection with the clutch when desired.

It will be seen that only three of the cylinders can be in compression, and thereby function to effect a driving of the shaft at the same time, that is to say only three pistons can at the same time be tending to move toward the crank pin. The drawings show three consecutive cylinders cut off from oil with driving capacity. It is possible however for the rotor to be in a position where four cylinders are cut off from oil at the same time. However only three of these will have driving capacity and the piston of the fourth will be tending to move away from the crank pin.

It will be seen that if the rotor is driven clockwise (as viewed in Fig. 1) the pistons of the cylinders on the left would tend to move toward the crank pin and as then they would be open to the groove 34 there would be no compression in any of the cylinders, the pistons of the cylinders on the right tending to move away from the crank pin. With this arrangement therefore, the crank shaft can be driven in one direction only and if the clutch is to operate in either direction a modified port construction is provided (Figs. 3 and 6).

In Fig. 3, is illustrated a modification of the clutch in which the shaft 31 is the driving member and the rotor is coupled to the driven member, the operation of the parts being substantially the same. The modified construction of the grooves of the crank pin shown in Figs. 3 and 6, is in fact a combination of two grooves like that shown in Fig. 4. Here the crank pin 32 is adjustable laterally in either direction from full clutch-open position. A groove 71 extends entirely about its circumference, said groove being widened on opposite sides of the center line on opposite sides of the pin sufficiently to provide what may be conveniently termed two longer groove sections 74 and 75, and two shorter and narrower diametrically disposed groove sections 72 and 73, between the longer sections. The four groove sections thus constitute the aforesaid groove 71, the shorter sections being in the same transverse plane, and of substantially the same length as the ports of the cylinders. When the shaft 31 is in the position shown in Fig. 3, all of the cylinders are in communication with each other and with the source of fluid through ports 35 in the crank pin, chambers 42 and channels 70, and when the shaft 31 is driven by the motor through the coupling 68 and its sliding spline connection 61, the cylinders will not be revolved by the crank pin. However, if the shaft 31 is longitudinally moved to the right so that the edge 76 of the groove 71 has passed the edge 77 of the cylinder ports by a small amount, then at least three of the cylinders will be cut out of communication with each other and with the ports 35 and if the shaft is rotated so as to put these cylinders into compression by the eccentric movement of the crank pin 32, they will become locked thereby with the shaft and will function to drive the rotor 38 and the bevelled gear 62. Correspondingly if the shaft is driven in the opposite direction and the shaft and crank pin are longitudinally moved to the left in a corresponding position with regard to the cylinder ports, a corresponding driving action will result in said reverse direction.

It will be seen that by the use of this form of grooved crank pin, in whichever direction the rotor is to be driven, there will be three functioning cylinders thereby making possible the use of the clutch with a reversible motor. It will be obvious that this arrangement of grooves, while shown in connection with the modified construction of Fig. 3, is also adapted to the construction of Fig. 1, and the invention contemplates its employment in any design of clutch where suitable.

It will be understood that while this invention is particularly adapted for use with a locomotive, it is not limited to such use but may be employed in any capacity wherein such transmission of power is desired, nor is it limited to the particular construction and arrangement of parts herein disclosed to exemplify the invention but the structure may be modified in many respects within the principle of the invention and the scope of the appended claims.

The invention claimed and desired to be secured by Letters Patent is:—

1. A hydraulic clutch comprising a rotor, a crank shaft centrally disposed with relation to said rotor, a plurality of cylinders revolvably mounted around said crank shaft, within said rotor, piston elements slidably disposed in said cylinders and pivotally connected to said rotor, a source of fluid, and means associated with said crank shaft including a passage-way in the crank shaft adapted to control the flow of said fluid into and from said cylinders, to entrap fluid within certain of said cylinders during relative inward movement of their respective piston elements while simultaneously permitting the flow of fluid into certain other of said cylinders during relative outward movement of the respective piston elements of said other cylinders, whereby said crank rotor and said shaft may be cooperatively engaged to rotate together for the transmission of power therethrough.

2. A power transmitting device comprising rotatable driving means including a shaft, rotatable driven means including a shaft, a pair of coupling members for coupling said two means together disposed between the two means to be moved previous to their coupling action in directions opposite to each other by the driving means, said members operating to form a chamber for a fluid varying in volume simultaneously with said movements of the members whereby when the members move toward each other the fluid in the chamber will be subjected to pressure to produce a coupling pressure between the two means for transmitting the power, a source of fluid supply, a port in said chamber, and means for controlling the fluid from the supply to and from the chamber through said port including a crank pin associated with one of said shafts for opening and closing the port, the opening being timed to admit fluid to the chamber when the members are moving away from each other and the closing being timed to entrap the fluid in the chamber when the members are being moved toward each other to thereby produce the coupling pressure for said power transmission.

3. A hydraulic clutch comprising a rotor, a crank shaft centrally disposed with relation to said rotor, a plurality of cylinders revolvably mounted around said crank shaft within said rotor, piston elements slidably disposed within said cylinders and pivotally connected to said rotor, a source of fluid, and means on said crank shaft having ports formed therein communicating with said source of fluid, said means and crank shaft being slidably adjustable with relation to said rotor, to bring said ports into and out of communication with said cylinders and control the flow of fluid into and from said cylinders, to entrap fluid within certain of said cylinders during relative inward movement of their respective piston elements while simultaneously permitting the flow of fluid into certain other of said cylinders during relative outward movement of the respective piston elements of said other cylinders, whereby said rotor and said crank shaft may be cooperatively engaged for the transmission of power therethrough.

4. A hydraulic clutch comprising a rotor, a crank shaft, centrally disposed with relation to said rotor, a source of fluid, a crank pin disposed on said crank shaft having ports formed therein communicating with said source of fluid, a plurality of cylinders revolvably mounted around said crank pin having openings in their ends adjacent the crank pin, and piston elements slidably disposed within the cylinders and pivotally connected with said rotor, said crank shaft and crank pin being slidably adjustable with relation to the cylinders to bring said crank pin ports into and out of communication with said openings of the cylinders to control the flow of fluid into and from said cylinders, whereby said rotor and said crank shaft may be cooperatively engaged to rotate together for the transmission of power therethrough.

5. A hydraulic clutch comprising a rotor, a crank shaft centrally disposed with relation to said rotor, a source of fluid, a crank pin disposed on said crank shaft having ports formed therein communicating with said source of fluid, a plurality of cylinders revolvably mounted around said crank pin having openings in their ends adjacent the crank pin, and piston elements slidably disposed within said cylinders and pivotally connected to said rotor, said crank shaft and crank pin being slidably adjustable to selectively bring said ports into and out of communication with openings in the cylinders to control the flow of fluid into and from selected cylinders, whereby upon adjustment of said crank pin, fluid will be drawn into said cylinders during the outward stroke of said piston elements and the flow of fluid from said cylinders will be restricted during the inward stroke of said piston elements and the said rotor and crank shaft may be thereby cooperatively engaged to rotate together for the transmission of power through said clutch.

6. A hydraulic clutch comprising a rotor, a crank shaft centrally disposed with relation to said rotor, a crank pin formed on said crank shaft, a spider rotatably mounted on said crank pin, a plurality of cylinders carried by said spider having openings adjacent the crank pin, pistons slidably disposed in said cylinders, said rotor being coupled to said pistons and said cylinder spider being adapted to permit eccentric movement of the spider in its rotation about the crank pin, and a source of fluid, said crank pin having ports formed therein communicating with said source of fluid and being slidably adjustable with said crank shaft with relation to the cylinders so as to bring said ports into communication with the cylinder openings to permit the fluid to pass into said cylinders upon the outward stroke of the pistons therein and to restrict the flow of fluid therefrom during the inward stroke of said pistons, whereby said rotor and drive crank shaft may be cooperatively engaged to rotate together for the transmission of power therethrough.

7. A hydraulic clutch comprising a rotor, a crank shaft centrally disposed with relation to said rotor, a crank pin formed on said crank shaft, a plurality of cylinders revolvably mounted on said crank pin having openings in their ends adjacent the crank pin, pistons operatively disposed in said cylinders, said rotor being coupled to said pistons and connected with said cylinders permitting eccentric movement of said cylinders in their rotation about the crank pin, and a fluid reservoir in said rotor, said crank pin having ports formed therein communicating with said reservoir, and said crank shaft and crank pin being slidably adjustable with relation to the cylinders to bring said ports into and out of communication with the openings in said cylinders to control the flow of fluid into and from said cylinders, whereby said rotor and crank shaft may be cooperatively engaged to rotate together for the transmission of power therethrough.

8. A hydraulic clutch comprising a rotor, a crank shaft centrally disposed with relation to said rotor, a crank pin formed on said crank shaft, a source of fluid, a plurality of cylinders revolvably mounted around said crank pin for eccentric movement with relation to the crank shaft, said cylinders having openings in their ends adjacent the crank pin, and piston elements operably disposed within said cylinders and pivotally connected to said rotor, said crank shaft and crank pin being slidably adjustable with relation to the cylinders, and said crank pin having a circumferential groove of varied width and ports formed therein, said ports communicating with said source of fluid and the circumferential groove, adapting said crank pin upon its adjustment, to control the flow of fluid into and from the cylinders to engage the cylinders with the crank pin and cooperatively engage the rotor and crank shaft to rotate together for the transmission of power therethrough.

9. A hydraulic clutch comprising a rotor, a crank shaft centrally disposed with relation to said rotor, a crank pin formed on said crank shaft, a source of fluid, a plurality of cylinders revolvably mounted around said crank pin for eccentric movement with relation to the crank shaft, said cylinders having openings in their ends adjacent the crank pin, and piston elements operably disposed within said cylinders and pivotally connected to said rotor, said crank shaft and crank pin being slidably adjustable with relation to the cylinders, and said crank pin having a circumferential groove of varied width and ports formed therein, said ports communicating with the said source of fluid and the circumferential groove, and said groove being adapted upon adjustment of said crank pin to be placed in communication with the openings in the cylinders in which the piston elements are making an outward stroke to permit intake of fluid, and out of communication with the cylinders in which the piston elements are making an inward stroke to allow the flow of fluid therefrom to be restricted to lock the crank pin with the cylinders whereby the rotor and the crank shaft will be cooperatively engaged to rotate together for the transmission of power therethrough.

10. A hydraulic clutch comprising a rotor, a crank shaft centrally disposed with relation to said rotor, a crank pin formed on said crank shaft, a fluid reservoir in said rotor, a plurality of cylinders revolvably mounted on said crank pin for eccentric movement with relation to said crank shaft, said cylinders having openings in their ends adjacent the crank pin, and piston elements operably disposed in said cylinders and pivotally connected with said rotor, said crank shaft and crank pin being slidably adjustable with relation to said cylinders, and said crank pin having a circumferential groove of varied width and ports formed therein, said ports being in communication with said fluid reservoir and said groove, whereby upon adjustment of said crank pin, the wider part of the groove may be placed in communication with the openings of the cylinders in which the piston elements are making an outward stroke oppositely disposed thereto, thereby permitting the intake of fluid for said cylinders while said groove and ports are out of communication with the cylinders in which the piston elements are making an inward stroke, the flow of fluid from the last said cylinders being restricted thereby, and the crank pin becoming locked with said cylinders, and the rotor and crank shaft being cooperatively engaged to rotate together for the transmission of power therethrough.

11. A hydraulic clutch comprising a rotor, a crank shaft centrally disposed with relation to said rotor, a crank pin formed on said crank shaft, a source of fluid, a plurality of cylinders revolvably mounted on said crank pin for eccentric movement with relation to the crank shaft, said cylinders having openings in their ends adjacent said crank pin, and piston elements operably disposed in said cylinders and pivotally connected with the rotor, said crank shaft and crank pin being slidably adjustable with relation to said cylinders, and said crank pin having a circumferential groove formed therein of two widths, the greater width extending to one side of the center line of the groove for a distance of less than half of the circumference, and said crank pin having ports formed therein in communication with said source of fluid and said circumferential groove, the wider part of said groove being positioned so as to move toward the respective cylinders subsequent to the throw of the crank pin in the direction of said respective cylinders during relative movement of said crank pin and cylinders, whereby upon an adjustment of the crank pin said cylinders through their said openings will be placed in communication with said ports through said wider part of the groove, during which communication the piston elements of said cylinders will be relatively moving outwardly, and the intake of fluid for said cylinders will be permitted, while the groove and ports will be out of communication with the cylinders in which the piston elements are relatively moving inward, said crank pin restricting the flow of fluid from said latter cylinders to engage said latter cylinders with said crank pin, and said rotor and crank shaft thereby becoming cooperatively engaged for the transmission of power therethrough.

12. A power transmitting clutch comprising a driving member; a driven member; and means for operably connecting said members including an expansible and contractible liquid containing receptacle connected to one of said members and having a port, a source of liquid for supplying said receptacle through said port, and a part movable with the other member and having a wedging cam surface for contracting said receptacle, said part being adjustable for closing the port by said wedging cam surface during wedging engagement of said surface with said receptacle for entrapping fluid within said receptacle to produce a coupling wedging action between said part and receptacle, said port being open to said source and said receptacle being permitted free expansion when said wedging cam surface is not engaged with said receptacle.

13. A hydraulic clutch comprising a rotor, a crank shaft centrally disposed with relation to said rotor, a crank pin on said crank shaft, a source of fluid, a plurality of cylinders revolvably mounted around said crank pin for eccentric movement with relation to said crank shaft, said cylinders having openings in their ends adjacent said crank pin, and piston elements operably disposed in said cylinders and pivotally connected with said rotor, said crank pin being axially adjustable and having ports formed therein communicating with said source of fluid and a circumferential groove formed therein of varied width communicating with said ports, whereby when said crank pin is in clutch-free position said groove communicates with all of the cylinders through their said openings, and when said crank pin is adjusted axially in one direction while said rotor is rotating in one direction, or is adjusted axially in an opposite direction while said rotor is rotating in an opposite direction, a similar adjustment of said groove is thereby effected to close the openings of a part of the cylinders by an amount proportionate to the extent of said adjustment, to correspondingly restrict egress of fluid from said part of the cylinders, and when the piston elements of said part of the cylinders tend to move inwardly said crank shaft is driven by and in the direction of said rotor.

14. A hydraulic clutch comprising a rotor, a crank shaft centrally disposed with relation to said rotor, a crank pin on said crank shaft, a source of fluid, a plurality of cylinders revolvably mounted around said crank pin for eccentric movement with relation to said crank shaft, said cylinders having openings in their ends adjacent said crank pin, and piston elements operably disposed in said cylinders and pivotally connected with said rotor, said crank pin being axially adjustable and having ports formed therein communicating with said source of fluid and a circumferential groove formed therein of varied width communicating with said ports, and comprising two relatively narrow groove sections and two relatively wide groove sections respectively between the narrow sections and respectively offset to opposite sides of said narrow sections, whereby when said crank pin is in clutch-free position said groove communicates with all of the cylinders through their said openings, and when said crank pin is adjusted axially in the offset direction of one of said wide sections while said rotor is rotating in one direction or is adjusted axially in the offset direction of the other of said wide sections while the rotor is rotating in an opposite direction, a similar adjustment of said groove is thereby effected to close the openings of a part of the cylinders by an amount proportionate to the extent of said adjustment to correspondingly restrict egress of fluid from said part of the cylinders, and when the piston elements of said part of the cylinders tend to move inwardly said crank shaft is driven by and in the direction of said rotor.

15. A hydraulic clutch comprising a rotor, a shaft eccentric with said rotor and adapted to be coupled therewith, a source of fluid, a plurality of cylinders revolvably mounted around said shaft, said cylinders having openings in their ends adjacent said shaft, and piston elements operably disposed in said cylinders and pivotally connected with said rotor, said shaft being axially adjustable relative to said cylinders and having ports formed therein communicating with said source and a circumferential groove formed therein of varied width communicating with said ports, whereby when said shaft is in clutch-free position said groove communicates with all of the cylinders through their said openings, and when said shaft is relatively adjusted axially in one direction while said rotor is rotating in one direction, or is relatively adjusted axially in an opposite direction while said rotor is rotating in an opposite direction, a similar adjustment of said groove is thereby effected to close the openings of a part of the cylinders by an amount proportionate to the extent of said adjustment, to correspondingly restrict egress of fluid from said part of the cylinders, and when the piston elements of said part of the cylinders tend to move inwardly said shaft and rotor are coupled to rotate in the same direction.

16. A hydraulic clutch comprising a rotor, an axially adjustable shaft eccentric with said rotor and adapted to be coupled therewith, a source of fluid, a plurality of cylinders revolvably mounted around said shaft, piston elements operably disposed in said cylinders and pivotally connected with said rotor, and means associated with said shaft including a passageway in said shaft for controlling the flow of fluid into and from said cylinders, whereby axial adjustment of said shaft will effect a restriction of egress of fluid from a part only of said cylinders by an amount proportionate to the extent of said adjustment, and when the piston elements of said part of the cylinders tend to move inwardly said rotor and said shaft will be coupled to rotate in the same direction.

ROGER W. CLIFFORD.